United States Patent [19]

Walton et al.

[11] Patent Number: 4,809,731
[45] Date of Patent: Mar. 7, 1989

[54] LIQUID INJECTION APPARATUS HAVING AN EXTERNAL ADJUSTOR

[75] Inventors: Frank A. Walton, 295 Thornridge Ct. Argyle, Tex. 76226; Paul M. Perrinet, Merignac, France

[73] Assignee: Frank A. Walton, Lewisville, Tex.

[21] Appl. No.: 48,527

[22] Filed: May 8, 1987

Related U.S. Application Data

[63] Continuation-in-part of Ser. No. 692,668, Jan. 17, 1985, abandoned, which is a continuation-in-part of Ser. No. 610,755, May 16, 1984, Pat. No. 4,558,715.

[51] Int. Cl.⁴ .......................................... G05D 11/035
[52] U.S. Cl. ...................................... 137/99; 92/60.5; 417/489; 417/493; 417/502
[58] Field of Search ............... 417/284, 502, 493, 439, 417/489, 274; 137/99, 569; 251/273; 92/60.5

[56] References Cited

U.S. PATENT DOCUMENTS

| Re. 29,193 | 6/1974 | Carlyle | 137/99 |
|---|---|---|---|
| 1,506,834 | 9/1924 | Hook | 251/75 |
| 1,674,614 | 6/1928 | Berkman | 417/403 |
| 1,859,834 | 5/1932 | May | 251/273 X |
| 1,887,836 | 11/1932 | Faber | 137/596 |
| 2,044,044 | 6/1936 | Anthony | 417/493 X |
| 2,262,031 | 11/1941 | Meyer | 137/99 X |
| 2,278,395 | 3/1942 | Lichte et al. | 417/493 |
| 2,712,427 | 7/1955 | Welborn et al. | 251/76 X |
| 2,750,930 | 6/1956 | Baur et al. | 121/164 |
| 3,136,256 | 6/1964 | Chenault | 427/493 X |
| 3,213,873 | 10/1965 | Cordis | 137/99 |
| 3,356,335 | 12/1967 | Koch et al. | 251/273 X |
| 3,405,606 | 10/1968 | Scheffer | 91/306 |
| 3,665,808 | 5/1972 | Vestal | 417/399 X |
| 3,680,985 | 8/1972 | Ginsberg et al. | 417/502 |
| 3,692,274 | 9/1972 | Rosen et al. | 251/75 |
| 3,753,528 | 8/1973 | Gibbs | 137/99 X |
| 3,880,055 | 4/1975 | Nakamura et al. | 417/489 X |
| 3,901,313 | 8/1975 | Doniguian et al. | 166/64 |
| 3,937,241 | 2/1976 | Cloup | 137/99 |
| 4,060,351 | 11/1977 | Cloup | 417/520 |
| 4,166,607 | 9/1979 | Webb | 251/273 X |
| 4,424,005 | 1/1984 | Manning | 417/440 X |
| 4,558,715 | 12/1985 | Walton et al. | 137/99 |

FOREIGN PATENT DOCUMENTS

| 475391 | 11/1937 | United Kingdom | 417/493 |
|---|---|---|---|
| 595458 | 12/1947 | United Kingdom | . |
| 2068475 | 8/1981 | United Kingdom | . |

Primary Examiner—Martin P. Schwadron
Assistant Examiner—Stephen M. Hepperle
Attorney, Agent, or Firm—Hubbard, Thurman, Turner & Tucker

[57] ABSTRACT

A liquid additive injection pump has a hydraulic motor comprising a differential piston assembly reciprocable in a housing under the urging of a primary liquid into which an additive is to be injected. The piston assembly includes valves to effect the transfer of a primary fluid charge from the pump motor to a discharge passage and to effect reciprocation of the piston assembly. The motor piston is connected to a central axially disposed piston rod which extends into an additive injection pump cylinder. In one embodiment a floating additive injection pump piston has a stack of displacement control washers engaged therewith and disposed on the piston rod. In another embodiment the pump piston passes through a seal member between a pump chamber and a bypass chamber and an elongated spiral groove formed on the periphery of the pump piston determines the effective displacement of the pump. A spring biased toggle type linkage snaps the motor valves into open and closed positions to provide positive movement of the valve members. Liquid additive is injected into the primary fluid stream at the outlet passage of the apparatus and downstream of the motor mechanism. An external adjustment mechanism is provided for variably presetting the effective displacement of the piston.

5 Claims, 5 Drawing Sheets

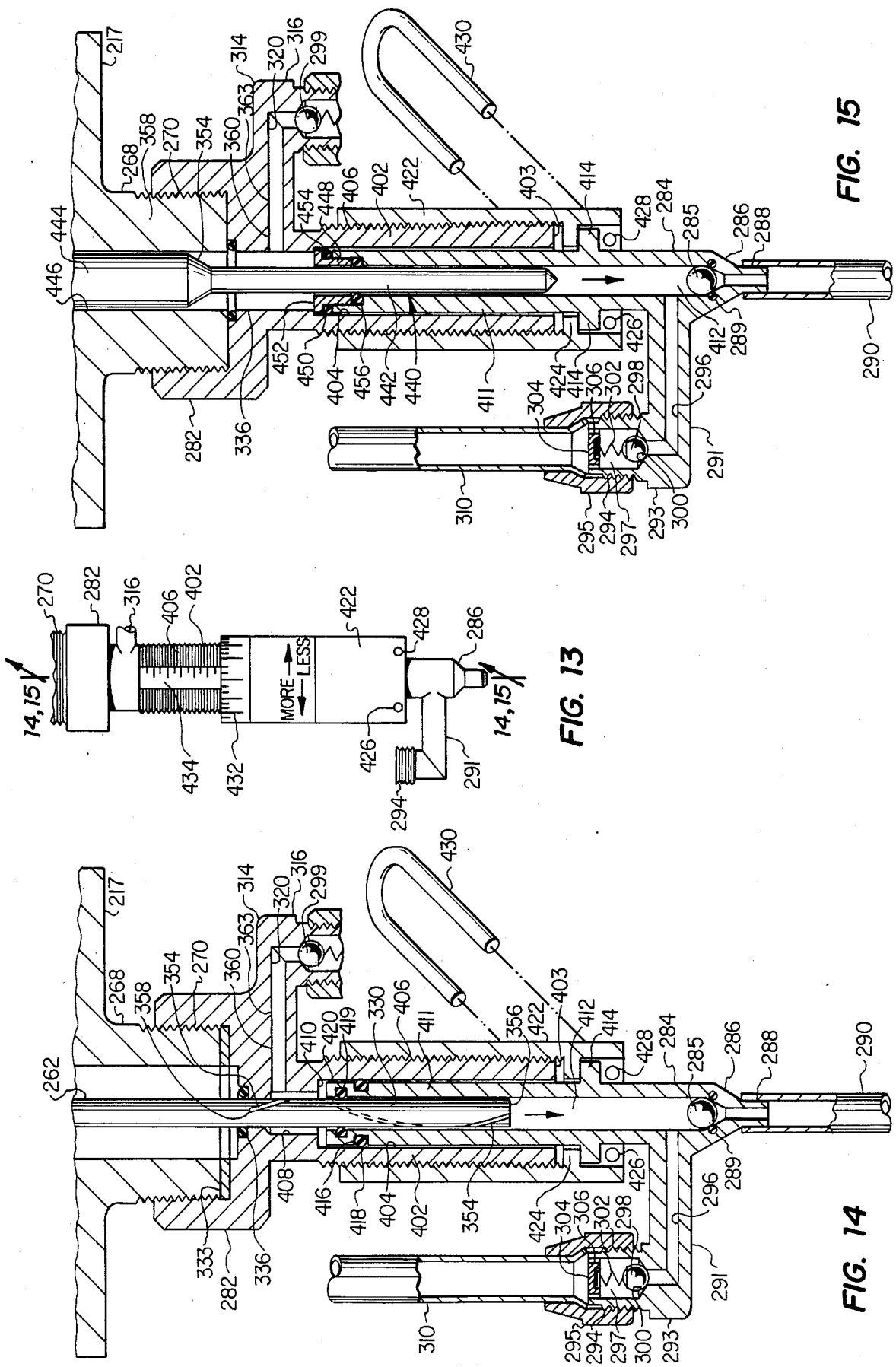

LIQUID INJECTION APPARATUS HAVING AN EXTERNAL ADJUSTOR

BACKGROUND OF THE INVENTION

Cross Reference to Related Application

This application is a continuation-in-part of co-pending application Ser. No. 692,668 filed Jan. 17, 1985, now abandoned, and which in turn is a continuation-in-part of co-pending application Ser. No. 610,755, filed: May 16, 1984 now U.S. Pat. No. 4,558,715.

FIELD OF THE INVENTION

The present invention pertains to a pumping apparatus for injecting predetermined quantities of liquid additive into a fluid stream. The apparatus is adapted to be interposed in a conduit and powered by the primary fluid flowing through the conduit for operating an additive injection pump to inject relatively minute quantities of additives in predetermined volumetric ratios to the flow of the primary fluid.

Background

Several devices have been developed for injecting predetermined quantities of liquid additives into a liquid flow stream for such applications as adding medication to drinking water for livestock, treating water with additives such as chlorine or iodine and adding fertilizer concentrate to irrigation water, for example. An example of a device which is powered by the liquid stream to which the additive is being injected is described in U.S. Pat. Nos. 3,937,241 and 4,060,351 to Philippe Cloup. In the apparatus described in the Cloup patents, the additive or adjuvant is injected into the main fluid stream within the piston chamber of the hydraulic motor which drives the additive injection pump. This is particularly disadvantageous when the additive is a corrosive fluid such as chlorine, fertilizer or other chemically active substances.

In certain applications of fluid injection apparatus the quantity of additive fluid to be injected into the primary fluid stream in relation to the flow of the primary fluid is relatively minute. If a relatively large displacement type additive injection pump is modified to have a relatively short effective stroke length the pump will not prime or maintain a suitable prime during the suction and discharge strokes and, consequently, loss of control is experienced with the additive injection apparatus.

Another disadvantage of prior art apparatus of the general type described herein is the provision of a hydraulic motor and an injection pump mechanism wherein the driving forces do not act generally along the central axes of the motor piston and pump piston. It has been determined that it is important to provide a coaxial directed driving force to prevent skewing the respective pistons in their working bores, and to provide valve actuating mechanisms for the hydraulic motor which are operable to positively and reliably effect reciprocation of the motor piston. These desiderata and other features of the present invention will become apparent upon reading the following summary and detailed description.

SUMMARY OF THE INVENTION

The present invention provides an improved liquid additive injection pump apparatus of a type wherein a predetermined quantity of liquid additive may be metered into a primary fluid flow stream and wherein the primary fluid itself provides the motive fluid for actuating the additive injection pump.

In accordance with one aspect of the invention an additive injection pump is provided wherein a hydraulic motor having a differential piston is connected to a reciprocating piston additive injection pump so that the driving forces of the motor are directed generally along the central axes of the motor piston and the additive pump piston.

In accordance with another aspect of the present invention there is provided an improved additive injection pump wherein the predetermined quantity of additive is injected into the primary fluid stream at a point downstream of the pump actuating motor to avoid injecting corrosive substances into the motor mechanism itself.

In accordance with another aspect of the present invention an additive fluid injection pump is provided for injecting relatively small quantities of additive and includes means for externally controlling the effective displacement of the pump whereby the amount of liquid additive injected per stroke cycle of the pump may be selectively varied.

In accordance with yet another aspect of the invention there is provided an improved liquid additive injection pump having an improved primary fluid bypass valve arranged to bypass primary fluid from the motor inlet chamber to the motor discharge chamber to render the pump inoperative without shutting off the flow of primary fluid.

In accordance with still another aspect of the present invention there is provided a liquid additive injection pump having a unique mechanism for positively opening and closing fluid inlet and discharge valves for the pump hydraulic motor in response to reciprocation of the motor piston.

The present invention still further provides a fluid additive injection pump for injecting a fluid additive into a primary fluid flow stream which is powered by the primary fluid flow stream, is mechanically uncomplicated, reliable in operation and economical to manufacture and service. Those skilled in the art will further appreciate the above described features and advantages of the invention as well as additional superior aspects thereof upon reading the detailed description which follows in conjunction with the drawing.

BRIEF DESCRIPTION OF THE DRAWING

FIG. 12 is a detail section view taken along line 12—12 of FIG. 8;

FIG. 13 is a central elevation view of the additive injection pump in an alternative adjustor embodiment;

FIG. 14 is a sectional view as seen substantially from the position 14—14 of FIG. 13; and FIG. 15 is a modified sectional view as seen substantially from the position 15—15 of FIG. 13.

DESCRIPTION OF THE PREFERRED EMBODIMENTS

Figures 1, 2, 3:
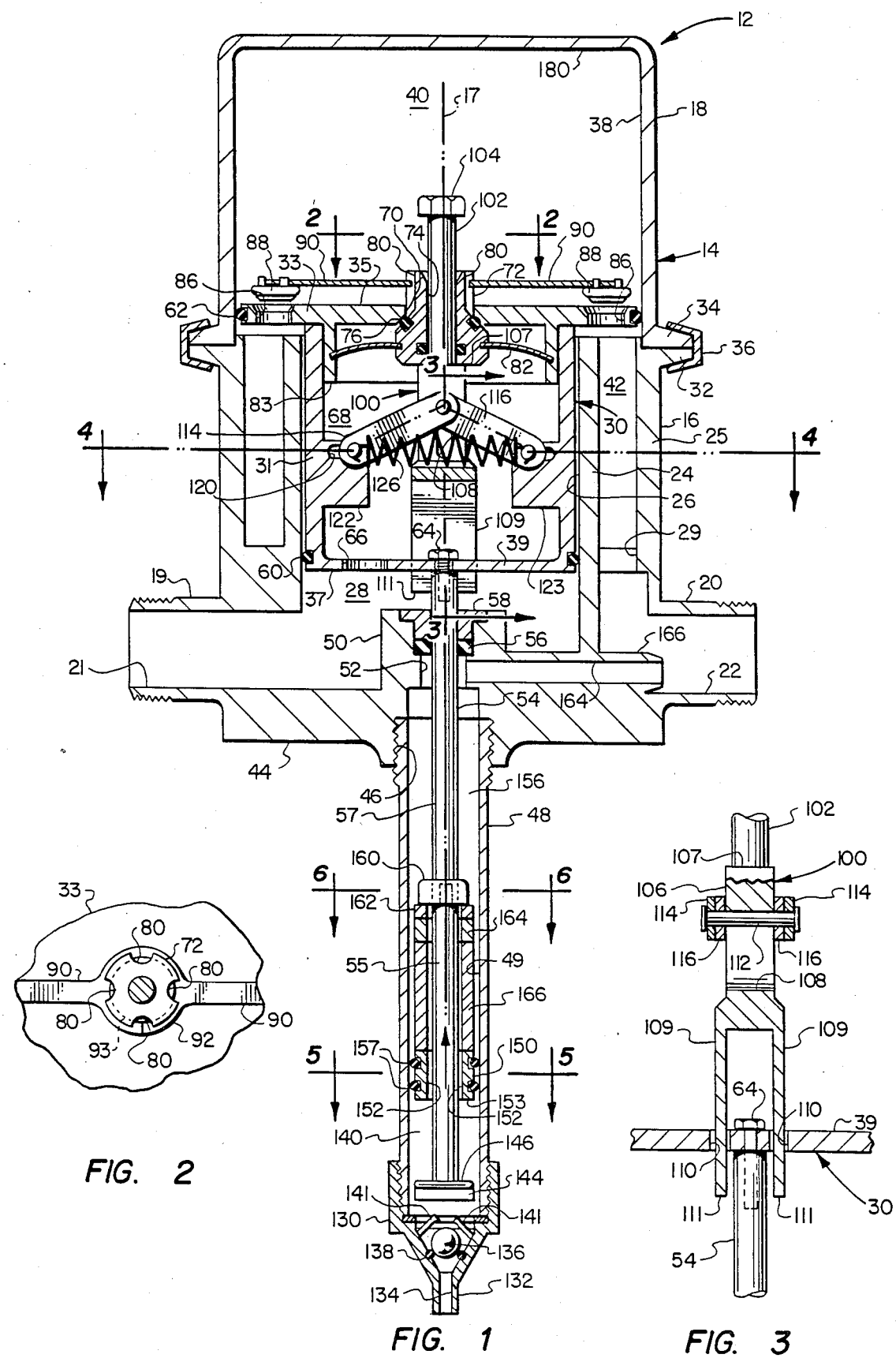
FIG. 1 is a longitudinal central section view of the additive injection pump apparatus of the present invention.
FIG. 2 is a detail section view taken along the line 2—2 of FIG. 1.
FIG. 3 is a detail section view taken along the line 3—3 of FIG. 1.

Referring to FIG. 1, a liquid additive injection pump apparatus is generally designated by the numeral 12 and comprises a housing 14 having a lower section 16 and an upper section 18. The housing section 16 includes opposed bosses 19 and 20 providing respective fluid inlet and discharge passages 21 and 22. The bosses 19 and 20 are adapted to be connected to a conduit, not shown, for conducting a primary liquid flow stream, such as water, into which a fluid additive is to be injected to flow with the liquid leaving the passage 22.

The housing 16 includes an interior cylindrical wall part 24 delimited by a cylindrical bore 26 forming a first expansible chamber 28 for a reciprocable piston assembly 30. The housing 18 is releasably clamped to the housing 16 across cooperating circumferential flanges 32 and 34, respectively, which are secured together with a band clamp 36. The housing 18 includes a bore 38 which is cooperable with the piston assembly 30 to form a second expansible chamber 40. The housing section 16 further includes a third expansible fluid discharge chamber 42 which is defined in part between the wall part 24 and an outer cylindrical sidewall 25. The chamber 42 is in communication with the fluid discharge passage 22 and the chamber 28 is in communication with the fluid inlet passage 21. The housing section 16 further includes a bottom wall portion 44 integrally formed with the sidewall 25 and having a threaded bore 46 coaxial with the bore 26 for engagement with one end of an additive injection pump cylinder 48. The housing part 16 still further includes an interior cylindrical boss 50 having a stepped bore 52 formed therein. A pump piston rod 54 projects through bore 52 and is in slidable sealing engagement with a conventional piston rod seal 56. The rod seal 56 is suitably retained in the bore 52 by a removable plug member 58.

The piston assembly 30 includes a first piston part 31 which is reciprocably disposed in the bore 26 and is in sealing engagement therewith by a piston ring seal 60. The piston assembly 30 includes a second piston part 33 of larger diameter than the piston part 31 and suitably secured thereto and slidably disposed in the chamber 40. The piston part 33 is in slidable sealing engagement with the bore 38 by a piston ring seal 62. The axially projected area of piston face 35 with respect to a longitudinal central axis 17 and exposed to the chamber 40 is greater than the opposed axially projected area of piston face 37 which is exposed to chamber 28. The differential areas between the effective piston faces 35 and 37 are important to the functioning of the motor utilizing the piston assembly 30. A bottom wall 39 of the piston part 31 is suitably secured to the upper end of piston rod 54 by a threaded fastener 64. The bottom wall 39 includes an opening 66 therein which communicates the chamber 28 with an interior chamber portion 68 of the first chamber 28 formed within the piston assembly 30. The piston part 33 includes a central bore 70 which is cooperable with a movable valve closure member 72 to place the chambers 28 and 40 in communication with each other and to effectively block the flow of fluid between the chambers 28 and 40.

Referring to FIGS. 1 and 2, the closure member 72 comprises a generally cylindrical plug having a central longitudinal bore 74 formed therein and having a resilient seating member 76 engageable with the piston part 33 to block communication between the chambers 28 and 40 through the bore 70. However, the closure member 72 is movable in a generally downward direction, viewing FIG. 1, to place the chambers 28 and 40 in communication with each other through grooves 80, see FIG. 2 also. The closure member 72 is adapted to be biased in the position shown or in an open position by a leaf spring 82 which is secured to the closure member 72 and is engaged with an axially projecting flange portion 83 of the piston part 33.

The piston part 33 further includes at least two fluid discharge valve passages 86 formed near the outer periphery of the part 33 and in communication with the chamber 42. Poppet type valve closure members 88 are disposed for closing the passages 86 and are supported on opposed radially projecting arms 90 of a support member 92 which is suitably secured on the closure member 72 in a peripheral groove 93, FIG. 2. Accordingly, when the closure member 72 moves to a position to place the chambers 28 and 40 in communication with each other the valve closure members 88 move to block flow of fluid between the chambers 40 and 42. The support arms 90 are somewhat resiliently deflectable to provide for suitable seating of the closure members 88 against the piston part 33 to close the passages 86.

Figure 4:
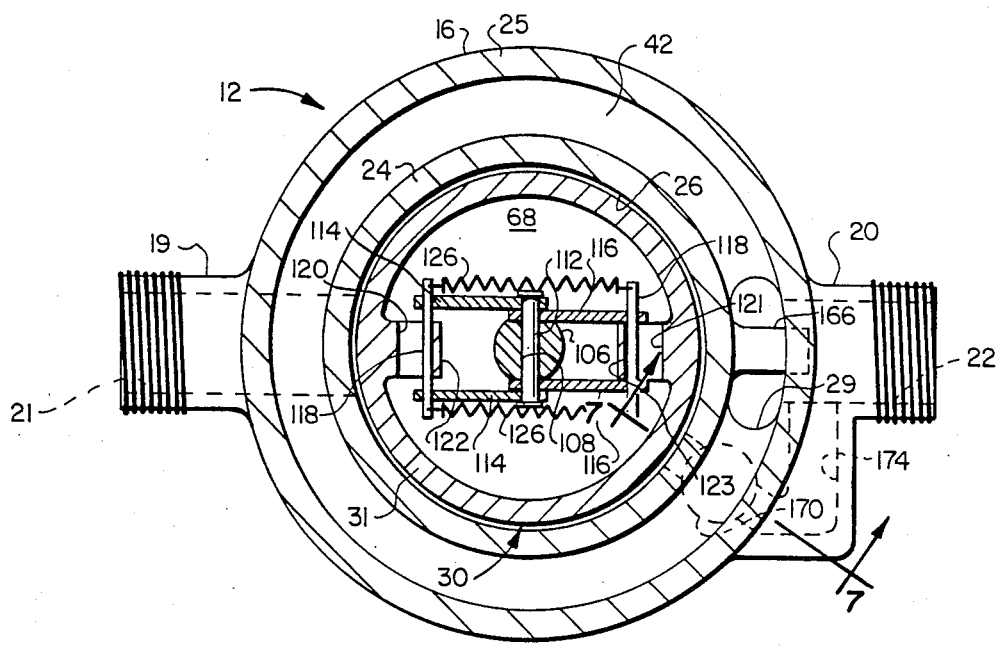
FIG. 4 is a detail section view taken along the line 4—4 of FIG. 1.

Referring now to FIGS. 1, 3 and 4, the valve members 72 and 88 are assisted in their movement between respective open and closed positions by a mechanism comprising shaft 100 having a portion 102 slidably disposed in the bore 78 and having a transverse collar portion 104 formed on its upper distal end, FIG. 1. The shaft 100 includes an enlarged diameter portion 106 forming a transverse shoulder 107 with the protion 102 and having an elongated slot 108 formed therein. The lower end of the shaft 100 includes a yoke formed by arms 109 which project through slots 110 formed in the piston bottom wall 39 on opposite sides of the upper end of piston rod 54.

The shaft 100 is biased in opposed limit positions by a mechanism including a lost motion coupling formed by a pin 112, FIGS. 3 and 4, disposed in the slot 108 and secured at its opposite ends to opposed links 114 and 116, respectively. The links 114 and 116 are retained on the pin 112 and are pivotal relative to the pin 112. The opposite ends of the links 114 are connected to a pin 118 disposed in an elongated slot 120 formed in a boss 122 on the piston part 31. In like manner, the links 116 are suitably secured to a second pin 118 disposed in an elongated slot 121 formed in a boss 123 opposite the boss 120. The pins 118 are secured to a pair of extension coil springs 126 which yieldably bias the pins toward each other to their limit position in the slots 120 and 121. However, in response to movement of the piston assembly 30 in an upward direction, viewing FIG. 1, the links 114 and 116 are operable to extend the pins 118 in the slots 120 and 121 through the centered position of the links to snap the closure member 72 into an open position and the closure members 88 into a closed position. In response to downward movement of the piston assembly 30 the distal ends 111 of the arms 109 are engageable with the boss 50 to move the links 114 and 116 through a centered position to snap the closure member 72 in a closed position and the closure members 88 into an open position, as illustrated in FIG. 1.

The liquid injection pump cylinder 48 is closed at its lower end by a removable cap 130 which includes a fitting 132 forming a liquid additive inlet passage 134. The cap 130 is threaded to the lower end of the cylinder 48 and also is provided with a ball type check valve 136 engageable with a seat 138 to prevent flow of fluid out of an interior chamber 140 through the passage 134. The check valve 136 is suitably retained for limited movement away from seat 138 by opposed retainer fingers 141. The piston rod 54 extends substantially through the chamber 140, in the position of the piston assembly 30 illustrated in FIG. 1, and includes a lower transverse flange 144 supporting a circumferential seal member 146.

Figure 5:
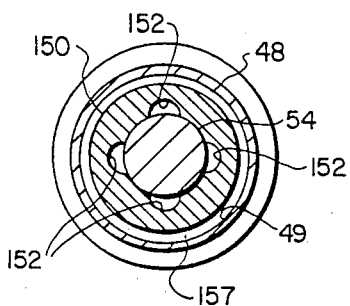
FIG. 5 is a section view taken along the line 5—5 of FIG. 1.

Referring to FIGS. 1 and 5, in particular, the pump cylinder 48 includes a longitudinal bore 49 defining, in part, the chamber 140 and slidably supporting an additive injection pump piston 150. The piston 150 is slidably journalled on the rod 54 and includes a plurality of longitudinal passages 152 formed therein and communicating the chamber 140 with a chamber portion 156 formed in the cylinder 48 between the piston 150 and the seal 56. A lower transverse end face 153 of piston 150 is engageable with the seal ring 146, however, to close off communication of fluid between the chambers 140 and 156 through the passages 152. The piston 150 is supported in the bore 149 by piston ring seals 157 disposed in circumferential grooves formed in the piston 150.

Figure 6:
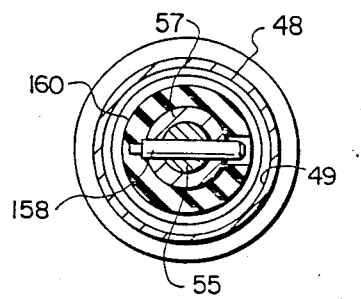
FIG. 6 is a section view taken along the line 6—6 of FIG. 1.

Referring to FIGS. 1 and 6, piston rod 54 includes a separable rod section 55 which is secured to an upper rod section 57 by a transversely extending retaining pin 158, FIG. 6, which extends through cooperating transverse bores formed in the rod sections 55 and 57, respectively, to join the rod sections together. The pin 158 is retained in the position shown in FIG. 6 by a resilient retaining collar 160 which is removable to permit extraction of the pin 158. The collar 160 also forms a retainer for a plurality of pump displacement control washers 162, 164 and 166 retained on the rod 54 between the collar 160 and the piston 150. The washers 162, 164 and 166 are preselected in accordance with the predetermined quantity of liquid to be injected per stroke of the additive injection apparatus and placed over the rod section 55 for retention between the piston 150 and the collar 160. The washers 162, 164 and 166 are of smaller diameter than the bore 49 and are loosely retained on the piston rod 54 to permit free flow of additive fluid therearound.

A fluid additive substance may be injected into the primary fluid flowing through the apparatus 12 by injection of the additive fluid into the passage 22 downstream of the motor formed, in part, by the piston assembly 30 so that the additive will not be exposed to the piston assembly, its seals, the valves 72 and 88 or the valve actuating mechanism described hereinabove. In this regard, the housing section 16 is provided with a passage 164 formed by a conduit 166 extending from communication with the chamber 156 into the passage 22 whereby displacement of fluid from the chamber 156 by the piston 150 results in injection of fluid into the passage 22 to mix with the primary fluid after it has passed substantially through the apparatus 12.

Figure 7:
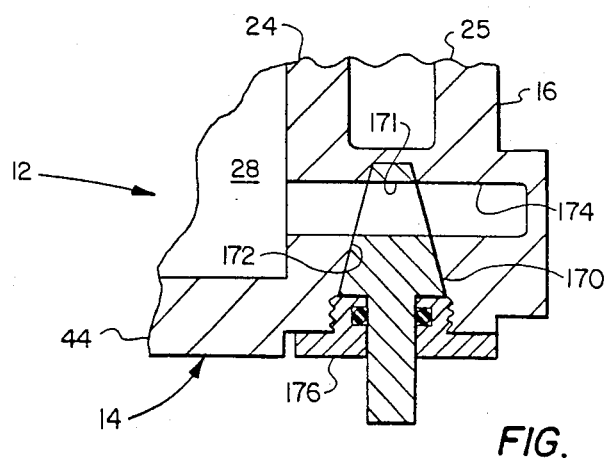
FIG. 7 is a detail section view taken along line 7—7 of FIG. 4.

Referring briefly to FIGS. 4 and 7, the apparatus 12 also includes a bypass valve for bypassing the primary fluid which would normally flow through the apparatus 12 directly from the chamber 28 to the passage 22 without actuating the motor piston assembly 30. A tapered plug valve closure member 170 is supported in a tapered valve bore 172 formed in the housing 16 and interposed in a passage 174 which extends between the chamber 28 and the passage 22 as indicated in FIGS. 4 and 7. The closure plug 170 is suitably retained in the the bore 172 by a removable retaining nut 176. In response to rotation of the closure plug 170 to the position shown in FIG. 7 primary fluid may flow directly from chamber 28 through passage 174 and a suitable passage 171 formed in the closure plug directly to the passage 22. The plug 170 may be rotated approximately 90° from the position shown in FIG. 7 to block the flow of fluid from chamber 28 directly to passage 22 by way of passage 174.

The operation of the apparatus 12 will now be described in conjunction with FIG. 1. In the position of the piston assembly 30 and the piston 150 illustrated in FIG. 1, it will be assumed that primary fluid under pressure is present in chambers 28 and 68 from a source, not shown, by way of passage 21 and that the bypass valve closure member is closed to block the passage 174. It will further be assumed that primary fluid at a reduced pressure is present in chambers 40, 42 and passage 22 and, since the valves 88 are in an open position the pressure is the same in these respective chambers. It will also be assumed that the passage 134 is in communication with a source of fluid additive, not shown, and that a quantity of additive has been drawn into chamber 140 as the result of a previous operating cycle of the piston 150 and the piston rod 54. Due to the higher pressure of fluid in the chambers 28 and 68 than the fluid pressure in chambers 40 and 42 the piston assembly 30 is being urged to move upwardly due to a pressure fluid force acting across the effective area defined by the piston face 37.

As the piston assembly 30 moves upward from the position shown the flange 144 moves to sealingly engage the piston 150 with the seal 146. As soon as the seal 146 engages the piston 150 additive fluid trapped in chamber 156 is forced through passage 164 into passage 22 during further upward movement of the piston 150. At the same time check valve 136 opens to admit a fresh charge of additive fluid to the chamber 140 below the piston 150. As the piston assembly 30 moves upward, the collar 104 becomes engaged with the transverse housing wall 180 in their respective slots 120 and 121 toward a centered position of the respective links 114 and 116. Since the volume of the chamber 42 does not increase at the same rate as decrease in the volume of chamber 40 some displacement of primary fluid occurs from chamber 42 through passage 29 and passage 22 to mix with the additive being injected into passage 22 during the upward stroke movement of the piston assembly 30 and the piston 150.

As the piston assembly 30 moves further upward, the links 116 and 118 move over center and the springs 126 urge the pins 118 toward each other to cause the pin 112 to translate rapidly to the bottom end of slot 108 impacting the shaft 100 and snapping the valve closure member 72 into the open position. The biasing spring 82 also passes through an overcenter postion and assists in urging the closure member 72 open against the urging of pressure fluid acting thereon in chamber 68. Movement of the closure member 72 to the open position also effectively closes the passages 86 by the seating of the valves 88 against the piston part 33.

With the valve member 72 in an open position pressure fluid at the higher pressure in chambers 28 and 68 is communicated through the passages 80 to the chamber 40 to act on the piston face 35. Since the axial projected face area of the piston face 35 is greater than the opposing effective face area 37, the piston assembly 30 is now urged to move downwardly, as fluid flows into the chamber 40. Movement of the piston assembly 30 in the downward direction displaces fluid from the chamber 42 through the passage 22 to further mix with the charge of liquid additive which was injected into the passage during the upstroke of the piston assembly.

As the piston assembly 30 moves downward the valve closure member 72 remains in the open position and the links 114 and 116 and pin 112 remain in the position into which they were displaced during upward movement. The piston 150 and the washers 162, 164 and 166 also remain stationary in the upward position described, even though the piston rod 54 is moving downward, due to frictional engagement of the piston ring seals 157 with the bore wall 149, until the collar 160 engages the assembly of the washers 162, 164 and 166 and the piston 150. Further downward movement of the rod 54 will displace the piston 150 and washers 162, 164 and 166 with the rod 54. During downward movement of the piston rod 54 the check valve 136 is normally in a closed position.

As the piston assembly 30 and the rod 54 move back to the starting position, fluid in the chamber 140 flows around the flange 144 and through the passages 152 in the piston 150 to maintain the chamber 156 full of liquid additive. The distal ends 111 of the shaft arms 109 become engaged with the top of the boss 50 to move the shaft 100 upward relative to the piston assembly 30 until the links 114 and 116 move to and through the center position whereupon the springs 126 snap the pin 112 to the upper end of slot 108 impacting the shaft 100 and moving it upwardly engaging the shoulder 107 with the valve closure member 72 and forcibly displacing the valve closure member back to the position illustrated in FIG. 1. The closure member 72 is assisted in its movement and biased into the closed position by the spring 82. As soon as the valve 72 closes and the valve members 88 open, the piston assembly 30 commences an upstroke described previously; however, displacement of a predetermined quantity of additive does not occur until the seal 146 engages the bottom face 153 of piston 150 to close off communication between chambers 140 and 156.

The amount of fluid additive injected per stroke cycle of the piston assembly 30 is preselected by the overall height of the washer stack comprising the washers 162, 164 and 166. Additional washers may be interposed between the piston 150 and the collar 160 or, one or more of the washers shown may be removed from the piston rod 54. The fewer number of washers or the smaller the thickness of the washer stack between the piston 150 and the collar 160 the smaller will be the quantity of liquid injected during a stroke cycle of the piston 150 since, upward displacement of the piston 150 by the rod 54 does not occur until the seal 146 engages the face 153. The number of washers retained on the piston rod 54 may be conveniently changed by unthreading the cylinder 48 at its connection with the housing 16, removing the collar 160 and the pin 158 to separate the rod section 55 from the rod section 57 whereby washers may be added to or removed from the rod section 55 at will. The rod section 55 is then reassembled with the rod section 57 and the cylinder 48 replaced. An external adjustment can be effected by means of the alternative structures described below.

The arrangement of the piston assembly 30, piston rod 54 and liquid additive pump piston 150 is such that all working forces acting on these parts of the apparatus 12 are directed generally along the central axis 17 and there is no tendency to cock or skew the piston assembly 30, the rod 54 or the piston 150.

Figure 8:
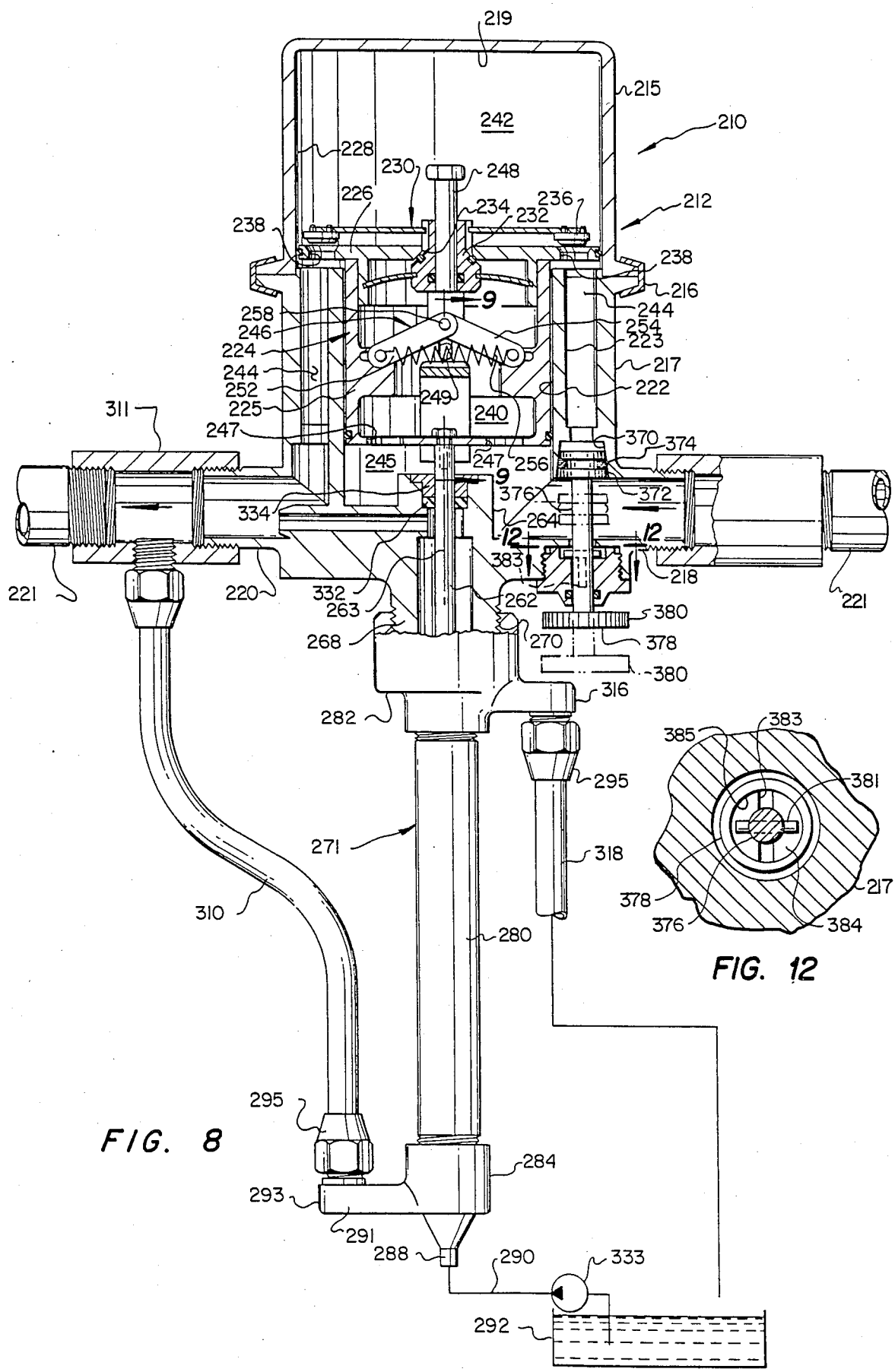
FIG. 8 is a longitudinal central section view of another embodiment of the additive injection pump apparatus.
Figure 9:
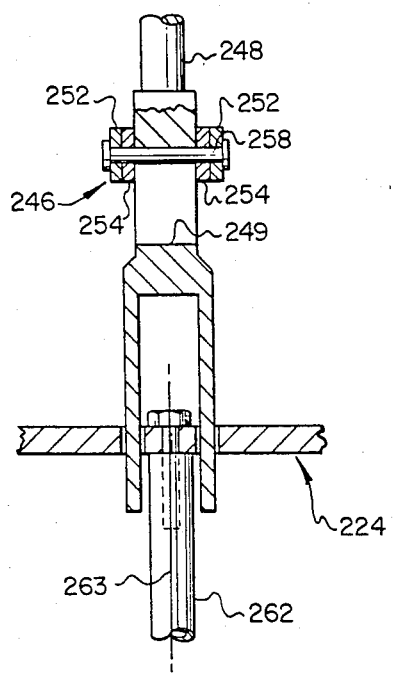
FIG. 9 is a detail section view taken along the line 9—9 of FIG. 8.

Referring now to FIGS. 8 and 9, another embodiment of an additive injection apparatus 210 is adapted to utilize a linearly reciprocable hydraulic motor 212 similar to the motor for the apparatus 12. The motor 212 comprises a housing 214 which may be formed in upper and lower sections 215 and 217 joined together by a suitable band type fastener 216. The housing section 217 includes respective primary fluid inlet and discharge passages formed in conduit portions 218 and 220 for interposing the motor 212 in a fluid conduit such as a domestic water supply line or the like 221. The housing section 217 includes an interior cylindrical wall 223 forming a cylinder bore 222 in which a piston assembly 224 is reciprocably disposed. The piston assembly 224 includes a first piston part 225 slidably disposed in the bore 222 and a second piston part 226 slidably disposed in a bore portion 228 formed in housing section 215.

The piston assembly 224 includes a valve assembly 230 including a first valve 232 operable to form a closure for a bore 234 and connected to a second valve 236 operable to close over respective ports 238 in the piston part 226. The valve assembly 230 is operable to effect admission of pressure fluid from a chamber 240 within the piston assembly 224 into a chamber 242 and from the chamber 242 into an annular passage 244 leading to the discharge conduit 220. The chamber 240 is in communication with the inlet conduit 218 by way of a chamber portion 245 and openings 247 in the piston section 225.

Pressure liquid in the chamber 240 acting on the effective cross sectional area of the piston section 225 is operable to move the piston assembly 224 on an upstroke, viewing FIG. 8, until an actuating mechanism 246 including a rod 248 engages the wall 219 of the housing section 215 to effect opening of the valve 232 and closure of the valve means 236. When valve 232 opens pressure liquid is admitted to the chamber 242 to act on the larger effective cross sectional area of the piston section 226 to reciprocate the piston assembly in the opposite direction. The mechanism 246 includes and overcenter biasing linkage comprising opposed links 252 and 254 and a coil spring 256. The rod 248 includes a slot 249, see FIG. 9 also, in which a pin 58 is disposed for limited reciprocation to snap the rod 248 into an upper limit position closing the valve 232 and a downward limit position opening the valve 232 and closing the valve means 236 in response to the reciprocation of the piston assembly 224. The aforedescribed valve bearing and actuating linkage is virtually identical to the linkage described in conjunction with the embodiment shown in drawing FIGS. 1 through 7.

The piston assembly 224 is connected to an elongated pump piston rod 262 which extends through an interior boss 264 formed in the housing section 217 and through an exterior boss 268 which is provided with external threads 270 for receiving the upper end of an additive injection pump 271. The motor 212 is operable to reciprocate the piston rod 262 utilizing pressure of the primary fluid flowing through the conduit 221 in which the apparatus 210 is disposed and into which additive fluid such as chlorine or iodine solutions may be injected in minute quantities at a point downstream of the motor 212 in the direction of flow of the primary fluid. Since a measured quantity of fluid is displaced through the motor 212 with each stroke of the piston assembly 224 a direct relationship between displacement of the piston rod 62 and the effective displacement of the additive pump 271 is obtained for each stroke cycle of the motor 212. The line of action of resultant forces acting on the piston assembly 224 is also coincident with the central axis of the piston rod 262, and the liquid additive injected into the flowstream may be injected at a point downstream of the motor 212 itself to thereby prevent exposure of the motor working parts to the mixture of the primary fluid and the liquid additive.

Figure 10:
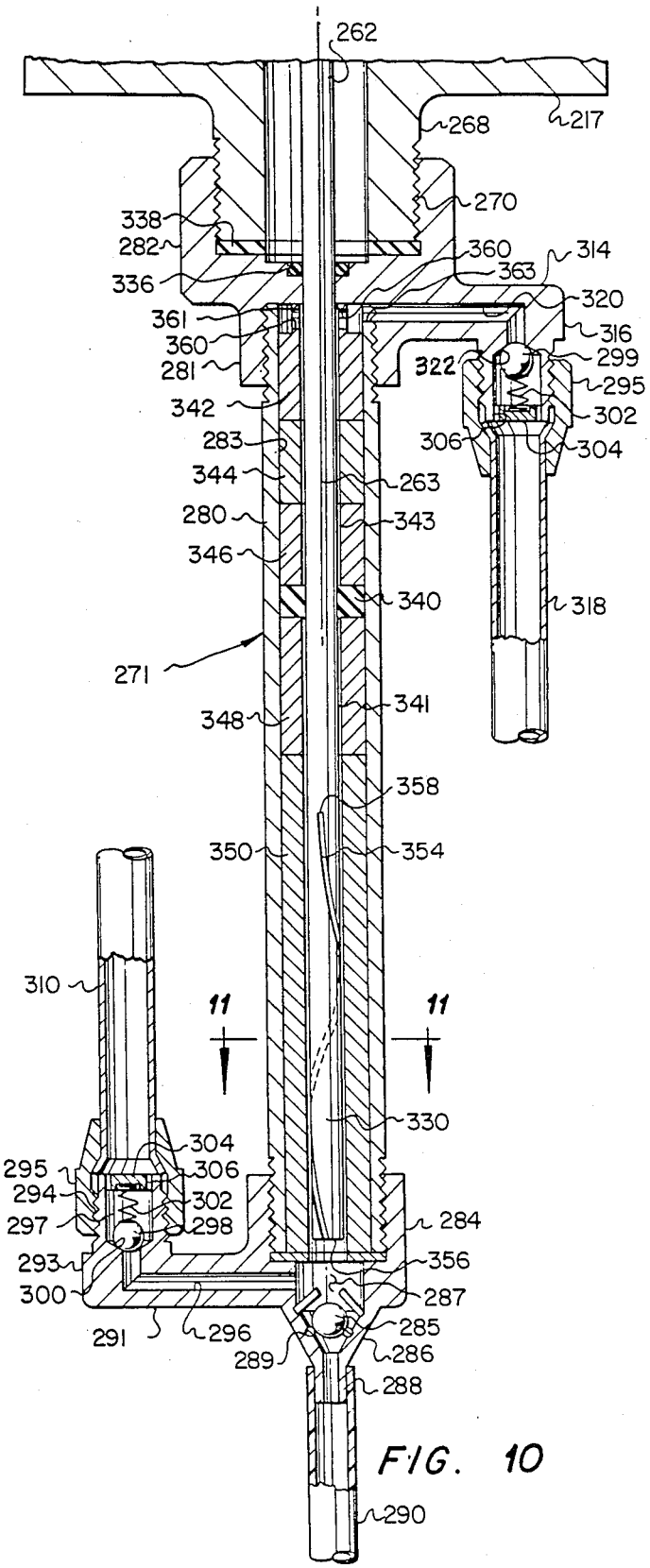
FIG. 10 is a central longitudinal section view of the additive injection pump of FIG. 8 on a larger scale.

Referring now primarily to FIG. 10, the additive injection pump 271 includes a cylinder tube or housing 280 threadedly coupled at its upper end to a boss 281 formed on an upper head member 282. The head member 282 is threadedly secured to the motor 212 at the boss 268. The additive fluid pump 271 further includes a lower head member 284 which is threadedly coupled to the opposite end of the cylinder tube 280 and includes a boss 286 forming an inlet conduit portion 288. The boss 286 is connected to a conduit 290, FIG. 8, in communication with a source of additive liquid such as a tank or reservoir 292. Referring again to FIG. 10, a ball type inlet check valve 285 is disposed in an inlet chamber 287 and is operable to engage a seat 289 secured in the boss 286. The lower head member 284 also includes a branch 291 forming a boss 293 provided with external threads 294 for receiving a coupler nut 295. An internal flow passage 296 is formed in the head member 284 in communication with the chamber 287 and opening into a chamber 297 in which a ball type discharge check valve member 298 is disposed and adapted to engage a valve seat 300. The valve member 298 is biased into the valve closed position by a spring 302 which is retained in the head member 284 by a removable insert 304. The insert 304 has suitable passage means 306 formed therein for allowing fluid to pass through the valve chamber 297 into an additive discharge conduit 310 connected to the head member 284 by the nut 295.

The upper head member 282 also includes a laterally extending branch 314 and an externally threaded boss 316 adapted to receive a nut 295 for connecting an additive fluid bypass conduit 318 to the head member 282 whereby additive fluid may be bypassed by the pump 271 back to the reservoir 292. A bypass check valve 299 is also disposed in a passage 320 formed in the head member 282 and is retained in a closed position bearing against a seat 322 by a spring 302 retained by an insert 304. The passage 320 is in communication with the bore 283 by way of a connecting passage 363.

The pump 271 includes a reciprocating piston 330 comprising an integral extension of the rod 262. As illustrated in FIG. 8, the rod 262 extends through a seal 332 in the boss 64 held by a seal retainer cover 334. Referring to FIG. 10, a second seal 336 is suitably disposed in the head member 282 and is in sealing engagement with the rod 262 adjacent the point at which it enters the bore 283. A gasket member 338 may be interposed between the boss 68 and the head member 82. The diameter of the rod 262 is preferably constant throughout its length. The piston portion 330 extends through a third seal member 340 which may be interposed in the cylinder bore 283 by an arrangement of annular ringlike spacers 342, 344, 346, 348 and 350. The number of spacers 342 through 350 is exemplary and more or fewer spacers may be utilized.

Figure 11:
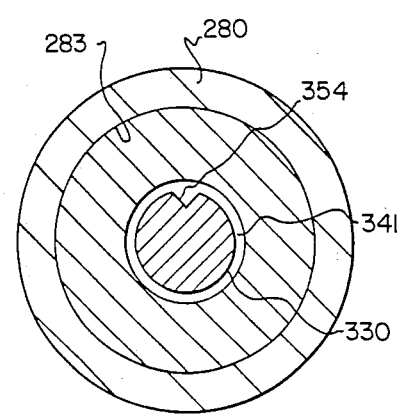
FIG. 11 is a detail section view taken along the line 11—11 of FIG. 9.

The piston 330 includes an axially extending spiral groove 354 formed on the periphery thereof, see FIG. 11 also, extending from a distal end 356 to an end 358 of the groove as indicated in FIG. 10. The groove 354 is formed in a spiral or helical fashion so that when the piston 330 reciprocates within the bore 283 and a portion of the groove 354 passes through the seal member 340 uniform wear is obtained around the periphery of the seal member to avoid cutting a groove in the seal. The spacers 342 through 350 are sufficiently larger in diameter than the piston 330 to form the respective chambers 341 and 343. The chamber 343 is in communication with the passage 320 by way of a plurality of laterally extending apertures 360, an annular groove 361 formed in the spacer member 342 and a groove 363 in the sidewall of cylinder tube 280.

The piston 330 is operable to reciprocate within the bore 283 in such a way that the end or control edge 358 of the groove 354 serves as a volumetric displacement control or cutoff point during a downstroke of the piston 330. When the groove end 358 moves from the chamber 343 through the seal member 340 into the chamber 341, communication between the chambers 343 and 341 is interrupted and further displacement of the piston 330 into the chamber 341 will result in reduction in the volume of chamber 341. This action will effect displacement of fluid through passage 296 opening the discharge check valve 298 and displacement of a predetermined quantity of fluid into the conduit 310 and into the primary fluid conduit 221 at a fitting 311 downstream of the motor 212.

When the motor 212 moves the piston 330 in the opposite direction the chamber 341 will fill with fluid from the conduit 290 as the volume of the chamber increases and, as the groove control edge 358 moves through the seal member 340 and into chamber 343 additive fluid may also flow into chamber 343 through the groove 354, particularly, if a low pressure charge pump, such as the charge pump 333, FIG. 8, is interposed in the conduit 290 between the reservoir 292 and the chamber 341. The charge pump 333 is suitably set to charge the chamber 341 with fluid but does not provide enough fluid pressure to unseat the discharge check valve 298 leading to conduit 310. However, the apparatus 10 may operate without a charge pump and rely on increasing displacement of the chamber 341 during an upstroke of the piston 330 to completely fill the chamber. The relatively long stroke of piston 330 and the small size of groove 354 will effectively draw fluid into the chamber 341 even in the absence of a charge pump 333. Moreover, the resistance to opening of valve member 298 will assure that effective displacement of the pump 271 occurs only upon the control edge 358 passing downward into the seal 340.

When the piston 330 reaches the limit of its upstroke and commences a downstroke movement the check valve ball 285 closes against the seat 289 and, as the piston 330 moves downward, additive is concomitantly displaced from the chamber 341 into the chamber 343 through the groove 354 until the groove control edge 358 reaches the seal 340. Fluid entering chamber 343 is displaced through apertures 360, the groove 363 in the end of cylinder tube 280, through passage 320 and valve 299 to conduit 318. Accordingly, the placement of the seal member 340 in the bore 283 determines the effective displacement of the piston 330.

The position of the seal member 340 may be easily changed by removing the cylinder tube 280 from the head member 282 or by removing the head member 284 from the lower end of the cylinder tube 280 and withdrawing the spacers 342 through 350, as needed, to reposition the seal member 340 between a selected pair of spacers. The spacer 342 remains in the position illustrated in FIG. 10, relative to the other spacers and may, in fact, be formed as part of the cylinder tube 280. By providing a piston such as the piston 330 which has a relatively long stroke length in relation to the diameter of the chambers 341 and 343, injection ratios in the range of 1.0 part additive to 3,000 parts primary fluid to 1.0 part additive to 15,000 parts primary fluid may be easily obtained with a piston having a diameter of about 3.0 millimeters and a stroke length of about 17.0 millimeters. An external adjustment can be effected by means of the alternative structures described below.

Referring to FIGS. 8 and 12, the motor 212 includes a unique valve arrangement for bypassing the primary fluid directly from the inlet conduit 218 to the annular chamber 244 so that it may flow through the conduit 220 without operating the piston assembly 224. The housing section 217 includes a tapered stepped bore 370 opening from the inlet conduit 218 into the chamber 244 and adapted to receive a valve closure piston 372 having a seal ring 374 disposed thereon. The closure piston 372 is connected to an operating stem 376 which extends through a removable retainer nut 378 and is connected to an operating handle 380. The actuating stem 376 includes a transversally extending retaining pin 381 whereby the stem 376 may be rotated to place the pin 381 in a slot 383 extending longitudinally in the nut 378 to permit movement of the valve closure piston 372 from the closed and locked position shown to an open position indicated by the dashed lines in FIG. 8. The bypass valve is normally maintained locked in the valve closed position, as illustrated, by rotating the stem 376 to place the retaining pin 381 adjacent a surface 384 formed by a counterbore 385 in the retaining nut 378. Accordingly, when it is desired to bypass primary fluid directly from the conduit 218 to the conduit 220 by way of the annular chamber 244 the operating handle 380 may be rotated to align the pin 381 with the slot 383 and moved to the alternate position illustrated in FIG. 1. This operation of bypassing primary fluid through the annular chamber 244 may include the chamber 242 depending on the position of the valve assembly 230. Accordingly, regardless of the position of the piston assembly 224 and the valve assembly 230, primary fluid may be conducted directly from the conduit 218 to the conduit 220 and typically rendering the piston assembly 224 inoperative while primary fluid is being bypassed directly to the discharge conduit line 221.

Referring now to FIGS. 13-15, there is disclosed alternative adjustor mechanism for variably presetting the effective displacement of the operating piston from an external location. By means thereof, the internal spacers utilized in the previous embodiments for that purpose and requiring disassembly to effect adjustment have been eliminated.

In the adjustor mechanism of FIG. 14, which is in other respects similar to the embodiment of FIG. 10 above, the underside of upper head 282 extends downwardly dependent as an elongated tubular neck 402 to a distal end 403. Defined within neck 402 is an elongated central bore 404 while about its exterior are contained external threads 406 extending substantially the length thereof. A counterbore 408 in communication with bore 404 is provided at an internal location near the upper end of the neck emerging from the radial shoulder 410.

Slidably received and longitudinally positionable within bore 404 is an upstanding tubular sleeve 411 that extends integral from lower head 284. Sleeve 411 includes an elongated internal bore 412 and an external annular flange 414 near its lower end for reasons as will be described. Within the periphery of sleeve 411 near its upper end is an annular recess 416 in which is contained a resilient seal 418 providing a pressure seal in the intervening spacing thereat. Defined internally of sleeve 411 also near its upper end is an annular recess 419 extending internally and containing a resilient gasket seal 420 adapted to cooperate with piston 330 in the manner of seal 340 described supra.

Threadedly mounted on threads 406 for adjustable displacement thereon is a tubular collar 422 including a radially inward extending annular flange 424 adapted to be positioned intervening between the distal end 403 of tube 406 and the annular flange 414 of sleeve 411. Formed in collar 422 at its lower end straddling sleeve 411 relatively below sleeve flange 414 are circumferentially spaced apertures 426 and 428. The apertures are adapted to receive a removable (or permanent if desired) U-shaped adjustment tool 430 which when in position within the apertures, enables the collar 422 to be rotated. With sleeve flange 414 being axially embraced between the juxtaposed flange 424 and tool 430 in the apertures, rotating the collar causes the collar to advance up or down on threads 406 while simultaneously displacing sleeve 411 slidably relative to neck 402. As a consequence, seal 420 secured in sleeve 411 is displaced therewith relative to the predetermined stroke of piston 330 so as to change the effective placement of the piston as described supra. Reference indicia 432 and 434 on the collar 422 and on the threaded shank of neck 402 respectively enables accurate adjustment in the displacement of seal 420 to be achieved.

Referring now to FIG. 15, there is provided in this embodiment a two-step piston designated 440. Comprising the piston is a small diameter elongated lower shank 442 adapted for reciprocal operation within bore 412 and merging with an enlarged upper portion 444 adapted for reciprocal operation within enlarged bore 446. Secured in a concentric recess provided in the upper end of sleeve 411 is a spool collar 448 having an annular flange 450 overlying the ends of sleeve 441 and underlying shoulder 452 internally provided in neck 402. Contained between flange 450 and the distal end of sleeve 411 is an annular gasket seal 454 providing a pressure seal between sleeve 411 and neck 402 thereat while contained in an annular pocket formed in sleeve 411 at the underside of collar 448 is an annular gasket seal 456 for cooperating with the surface of piston shank 442. Unlike the surface of piston 330 containing spiral groove 354, the surface of shank of 442 is smooth throughout for cooperating with seal 456.

The added virtues of the embodiment of FIG. 15 is in the larger draw of fluid achieved in the upstroke of the piston for the purpose of self priming. In operation, as before, the flow of water or other fluid into the system causes reciprocal operation of piston 440 to be incurred. The displacement of the larger piston 440 drives the shank 442 which on alternate strokes draws additive from conduit 290 and delivers additive concomitantly to passages 296 and 320. During each upstroke therefore fluid chemical additive is drawn inward of bores 412 and 446 and on each downward stroke, the additive is delivered either to passage 296 and conduit 310 for injection into the primary fluid stream or to passage 320 from which it is returned via conduit 318 to reservoir 292 as described supra. The relative amounts of fluid additive dispersed via passages 320 and 296 is controlled by the position setting of seal 456 relative to the predetermined stroke incurred by the piston 440. Positioning of the seal at a selected longitudinal location is in turn controlled by the adjustable setting of collar 422 whereby the seal 456 is displaced upwardly or downwardly in order to vary the injection ratio in relation to the quantity of primary fluid contained in the system.

As illustrated in FIG. 15, the sleeve 411 and consequently the seal 456 are respectively in their uppermost positions from which they can be adjusted downward in the manner described by means of tool 430. During reciprocation thereof, the tip of shank 442 will rise on the intake or upstroke above the seal 456 for drawing the fluid inward of bore 412 into bore 446 to provide fluid for flow through the bypass.

The operation of the apparatus 210 is believed to be readily understandable from the foregoing description of the operation of the apparatus 12 and the description of the motor 212 and the pump 271.

The entire apparatus 12 as well as the apparatus 210 may be made of conventional engineering materials utilized for pumps for pumping various types of corrosive as well as non-corrosive liquids.

What we claim is:

1. Apparatus for injecting a predetermined quantity of fluid additive into a primary fluid stream comprising:
    elongated cylinder means having a bore formed therein;
    opposed head means closing opposite ends of said bore;
    means forming fluid inlet, fluid discharge and fluid bypass passages, respectively, in communication with said bore;
    respective one way valves interposed in said passages for admitting additive fluid to said bore through said inlet passage and discharging additive fluid through said discharge and bypass passages, respectively;
    an elongated piston reciprocably disposed in said bore for effecting displacement of a predetermined quantity of additive fluid;
    seal means interposed in said bore and cooperable with said piston to form opposed fluid discharge and bypass chambers in said bore, said piston including passage means formed therein and cooperative with said seal means in such a way as to bypass additive fluid from said discharge chamber to said bypass chamber during a fluid displacement stroke of said piston to control the amount of fluid discharged to said discharge passage; and
    means for selectively positioning said seal means in said bore to vary the effective displacement of said piston means, said means for selectively positioning said seal means comprising a plurality of annular spacers insertable in said bore in predetermined relationship to each other and to said seal means.

2. The apparatus set forth in claim 1 wherein:
    said cylinder means is releasably coupled to one of said head means for removal of said one head means to gain access to said spacers for removal and reinsertion of said spacers in said bore in predetermined stacked relationship.

3. The apparatus set forth in claim 1 wherein:
    one of said head means includes a first boss for threadedly coupling said one head means to said cylinder means, a second boss on said one head means for connecting a discharge conduit to said one head means, and said one head means includes respective one way additive fluid inlet and discharge valves interposed in passage means in communication with said bore.

4. The apparatus set forth in claim 3 wherein:
    the other of said head means includes a first boss for threadedly coupling said other head means to said cylinder means and a second boss for connecting a bypass conduit to said other head means, and said other head means includes a one way additive fluid bypass valve comprising one of said one way valves and in said other head means and in communication with said bypass chamber.

5. The apparatus set forth in claim 1 including motor means for reciprocating said piston comprising:
    a housing defining first and second motor cylinder bores of different diameters, a differential piston assembly reciprocably disposed in said motor cylinder bores and forming first, second and third motor chambers in said housing;
    an inlet passage in said housing for conducting primary fluid under pressure to said first motor chamber to act on said piston assembly;
    a discharge passage in said housing for conducting primary fluid from said second and third motor chambers from said apparatus;
    means interconnecting said piston assembly with said piston rod for reciprocation with said piston assembly;
    first and second motor valves associated with said piston assembly and movable to respective positions to place said first and second motor chambers in communication with each other and close off communication between said second and third motor chambers and alternately close off said first motor chamber from said second motor chamber while communicating said second motor chamber with said third motor chamber; and
    means for moving said motor valves between said positions and biasing said motor valves in said positions, respectively, said piston assembly, said piston and said means for moving said motor valves being arranged generally along a central axis of said piston rod for causing forces acting on said piston assembly to reciprocate said piston rod to be directed substantially along said axis.

* * * * *